United States Patent Office 3,500,242
Patented Mar. 10, 1970

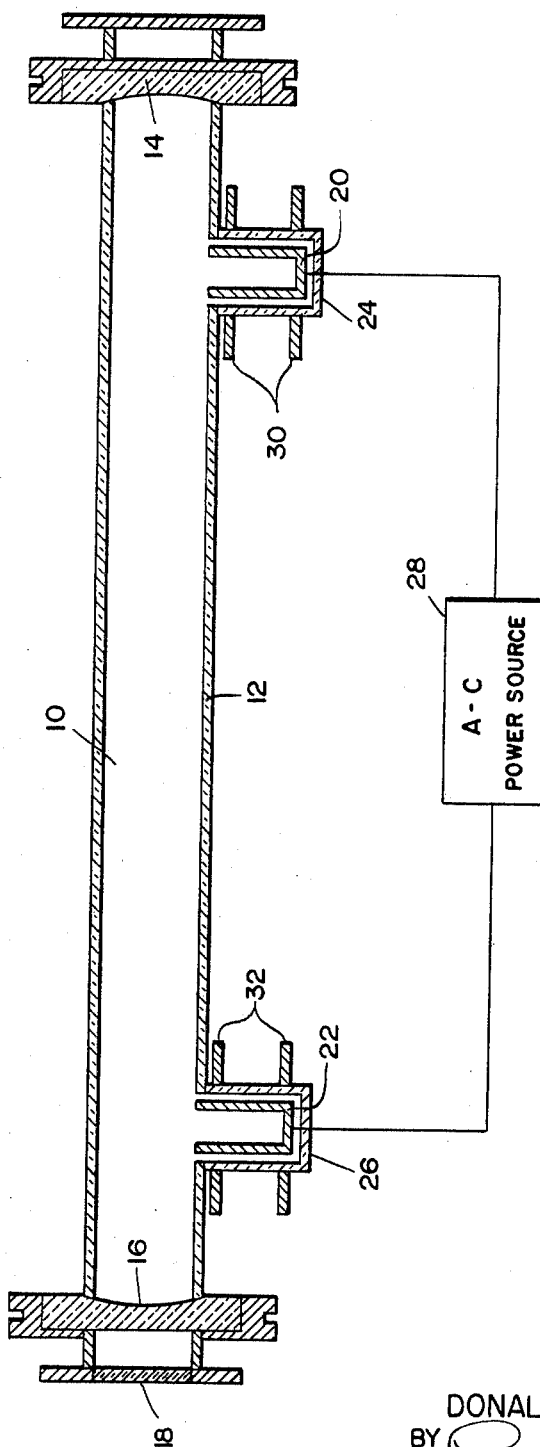

3,500,242
STATIC CO₂ GAS LASER
Donald S. Young, Windham, N.H., assignor to Sanders Associates, Inc., Nashua, N.H., a corporation of Delaware
Filed May 22, 1967, Ser. No. 640,321
Int. Cl. H01s 3/02, 3/09
U.S. Cl. 331—94.5
3 Claims

ABSTRACT OF THE DISCLOSURE

A sealed gas chamber spaced from the chamber wall a distance less than the mean free path of the gaseous ions of the lasing material to thereby reduce the sputtering of electrode material onto the chamber walls. Alternatively, a magnetic field is applied to the electrodes to deflect any ions which may be sputtered back toward the electrodes.

FIELD OF INVENTION

The present invention relates to lasers. More particularly, the invention relates to improvements in molecular gas lasers.

DESCRIPTION OF THE PRIOR ART

The operation of the laser is now well understood. It employs an active medium containing atoms or molecules which may be placed in an excited state to emit coherent light upon return to their original state. When electromagnetic energy of the proper frequency is passed through the active medium, or through another material which can excite the active medium the active medium absorbs this energy and is elevated to a so-called "upper laser level." The atoms or molecules thus excited tend to decay in stages. Generally they first drop from the upper laser level to a so-called "metastable state." This incremental decay results in the emission of useful energy in the form of coherent light.

The second drop, or series of energy level transitions, is from the "metastable state" to the absolute minimum or ground state. In this second drop the remaining energy used to elevate the medium to the upper energy level is dissipated in the form of unusuable light or heat, i.e. it is wasted. To maximize the power output of a laser for a given input power, therefore, it is desirable to select as active media those materials which, for a given input power, more atoms or molecules can be raised to the "upper laser level" than remain in the "metastable state," i.e. a population inversion.

The two general types of lasers now in common use are the solid state and the gas laser. The solid state laser has an active material consisting of a rather pure single crystal of a material such as a ruby or sapphire. This crystal in effect acts as a resonator. The wave energy propagates in a path between two reflectors, or mirrors, which are at each end of the crystal. One of the mirrors is partially transparent so that a portion of the energy can escape through it.

The gas laser operates much the same as a solid state laser when a noble or atomic gas such as helium, neon or argon is used. With these gases the laser energy is stored in electron orbits and photons are emitted as electron orbits are incrementally decreased. The noble gas laser requires a relatively large amount of input energy to raise the active material from the ground state to the upper laser level. There is then a relatively small energy release in the laser output during the transition from the upper laser level to the "metastable state."

This results in a large amount of wasted energy during the transition from the "metastable state" back to the ground state. Because it is so wasteful of radiation, the noble gas laser is not high among the choices where small size and large power outputs are required.

Due to the inefficiency of the noble gas laser, molecular gas lasers have come into vogue. These differ somewhat in operation from the noble gas laser because energy is stored in vibrations and rotations within a molecule rather than in changes of electron orbits. Such gases as carbon monoxide, carbon dioxide, nitrous-oxide, and carbon disulfide have been successfully used as active media in molecular gas lasers. These gases are elevated to the upper energy level by transfer of energy from another gas, e.g. nitrogen. The second gas acquires its energy by means of an electrical discharge through the gaseous medium. This mechanism is characterized by high efficiency. The ratio of laser output energy to excitation energy in a good molecular gas laser is about 1:10. For purposes of comparison, this same ratio with the noble gas laser is about 1:100.

One of the most vexatious problems with molecular gas lasers, however, is the fact that it is difficult to operate them as a closed system. As pointed out, the molecular gas must be excited by some other gas which carries the vibrational and rotational excitation to the active gas. $CO_2$ molecules in the "metastable state" must de-excite into the ground state to obtain a high population inversion. This is done by the addition of helium or other gases which carry vibrational and rotational excitation from the $CO_2$ in the "metastable state." Another important de-excitation process is by laser wall collisions. These collisions of the $CO_2$ molecules with the laser walls are proportional to the diffusion time constant in a static gas.

Furthermore, carbon dioxide does not provide long life in a sealed gas laser because electrode sputtering often occurs. This phenomenon causes depletion of the electrodes as they are sputtered into the laser chamber where they deposit out on the chamber walls. For some reason not fully understood, carbon dioxide is removed from the system as the chamber walls become metalized.

In order to solve the problems inherent in molecular gas lasers the so-called flowing gas technique was developed. This involves the utilization of a constant supply of molecular gas flowing into and out of the laser chamber or optical cavity where it is stimulated by means of some other gas such as nitrogen in the manner described above. The nitrogen is subjected to an electrical discharge in a chamber remote from the optical cavity and is admitted to the optical cavity in an excited condition. While this system obviates concern over the ionization of the molecular gas it requires gas storage equipment and complex plumbing in order to have the needed gases available and maintain the proper flow of molecular gas and nitrogen as well as the proper mixture of the two.

A carbon dioxide laser has an efficiency of about 15 percent in a flowing gas system and 6 percent in a static gas system which is higher than that of all other gas lasers now in use. Were it not for the problem of electrode sputtering of the carbon dioxide, a closed system laser providing high efficiency and the concomitant benefits of small size with high power levels could be developed.

The invention accordingly comprises the features of construction combination of elements, and arrangement of parts which will be exemplified in the construction hereinafter set forth, and the scope of the invention will be indicated in the claims.

SUMMARY OF THE INVENTION

Briefly, the gas laser herein described utilizes a unique elecrtode construction which substantially inhibits sputtering away of the electrode materials resulting from bombardment of the electrodes by ionic particles. It also inhibits the accompanying loss of active gas which occurs when the sputtered electrode material deposits on the chamber wall. By spacing the electrodes close to the chamber wall, that is to say a distance less than the means free path of gaseous ions which may cause sputtering off of the electrode material, ions do not exist between the electrode and wall, hence, deposition of the metallic electrode on the wall surface is inhibited. In one form this is accomplished by the use of a cup shaped electrode structure disposed in a coaxial, congruent recess in the chamber wall.

In another form, ions sputtered off of the electrodes are deflected back toward the electrodes by means of a magnetic field. This concept is well suited for use in combination with the cup shaped eelctrodes by employing a pair of magnets surrounding the electrodes but spaced axially apart to provide an axial field. Proper arrangement of the magnets can be utilized to shape the field so that sputtered electrode ions are directed back to the electrodes before they escape into the gas chamber and deposit on the wall surface. The field may also be arranged so that gas ions are directed into the cup shaped electrodes; thus most of the sputtered ions will originate form and stay inside the electrodes.

BRIEF DESCRIPTION OF THE DRAWING

For a fuller understanding of the nature of the invention, reference should be had to the following detailed description taken in connection with the drawing which shows a longitudinal section of an embodiment of the present invention.

DESCRIPTION OF PREFERRED EMBODIMENT

In the drawing the laser chamber or optical cavity 10 is defined by the tubular wall 12. The ends of the chamber 10 are sealed by mirrors 14 and 16. The mirror 14 is totally reflective and the mirror 16 is partially reflective so that radiant energy may exit through the mirror 16 and window 18.

The gases contained in the chamber 10 are excited by an electrical discharge between the electrodes 20 and 22. The electrodes 20 and 22 are housed in the coaxial recesses 24 and 26 respectively, removed from the optical path of the laser. The power for initiating and maintaining the electric discharge comes from an alternating current power source 28. Preferably annular magnet pairs 30 and 32 maintain axial magnetic fields along the recesses 24 and 26.

In operation, the tube 12, which is quartz or other suitable material, is filled with a mixture of carbon dioxide, nitrogen and helium. The nitrogen is included, as pointed out heretofore, because it is first excited and then it transfers energy to the carbon dioxide. The helium is added because it has been found that certain gases, such as heilum, increase the efficiency of the carbon dioxide laser. Operation is initiated by an electrical discharge between the electrodes 20 and 22. The voltage required to initiate the discharge is roughly proportional to the length of the cavity or chamber 10, or, more specifically, the separation between the electrodes 20 and 22.

Where weight and volume considerations are signficant, the voltage requirement for a given laser output can be cut in half by using two shorter laser tubes optically connected by means of a prism. In this case, the electrodes in the two tubes are connected in parallel and thus they operate at a potential difference half that required by a single tube twice the length of each "half tube."

Important elements of this laser are the cup shaped electrodes 20 and 22. These electrode may be elliptical, rectangular, cylindrical, or may assume some other polygonal form. They are, however, preferably cylindrical. It has also been found that the electrode should be made of platinum or some other noble metal to inhibit oxidation as $CO_2$ can ionize to CO and O. Many of the less costly, more active metals readily oxidize in the environment of the laser chamber thereby shortening the life of the laser. Platinum, on the other hand, does not readily oxidize although it has some tendency to sputer when bombarded by ions such as the nitrogen ions which are prevalent in the laser. Even with platinum, however, electrode sputtering is quite deleterious to laser life because the platinum ions sputtered off of the electrodes deposit out on the quartz tube apparently carrying carbon dioxide with them. This, of course, depletes the carbon dioxide supply.

The preferred physical arrangement of electrodes 20 and 22 largely avoids this problem. The applicant has discovered that if the distances between the electrodes 20 and 22 and the respective walls of the recesses 24 and 26 are less than the mean free path of the nitrogen or other gaseous ions at the operating temperature and pressure of the laser, there is a minimal number of ions to sputter the platinum on the laser walls. Ions striking the interior of the electrodes 20 and 22 cause sputtered platinum. However, due to the shape of the electrodes, the ions tend to be redeposited on the electrode walls. This arrangement has been found to be exceedingly effective in avoiding depletion of the carbon dioxide supply and prolonging electrode life.

An alternative method of accomplishing this same result involves placing annular magnet pairs 30 and 32 around the walls of the recesses 24 and 26. This Helmholtz-like arrangement creates a relatively uniform axial magnetic field between each magnet pair. The field focusses any sputtered platinum ions into the interior of the electrodes 20 and 22 where they are redeposited on the interior electrode walls. These two techniques may, of course, be combined to great advantage. When the cup shaped electrodes are used together with the magnet pairs, the magnet strength and spacing may be selected to shape the magnetic field to accomplish two desirable results. First, the field may be utilized to redirect sputtered ions into the cup shaped electrodes so that they will tend to remain in the cup. Second, any ions sputtered out of the cup or off of the cup exterior will be diverted back to the electrode by the field before they escape into the gas chamber and deposit on the wall surface.

A typical 10 watt laser of this type may be constructed using a 68 inch quartz, water cooled, discharge tube and platinum electrodes. The mirrors 14 and 16 for such a laser are, for example, quartz coated with evaporated gold and IRTRAN IV and ground concave to a two-meter radius. The mirror 16 is coated with dielectric layers to be partially transmissive at 10.6 microns and may be provided with stainless steel bellows assemblies to compensate for tube expansion and to provide angular adjustment so that it remains in a plane parallel to the mirror 14. The cup shaped electrodes are about $7/16$ inch in diameter, 2 inches long and are spaced apart 56 inches. When platinum is used for these electrodes they are spaced $5 \times 10^{-4}$ inches from the wall of the tube.

The same result, but with less bulk, is obtainable with two 34 inch tubes optically connected at one end by means of a Dove-type retroreflector used to fold the beam. In this case two stainless steel bellows are used to provide three axis adjustment of the prism or retroreflector. Here, a substantially totally reflective mirror is at one end of one chamber and an at least partially reflective mirror is at the adjacent end of the other chamber. The Dove retroreflector optically couples the two chambers at the other adjacent ends.

Non-flowing gas lasers utilizing carbon dioxide as the active material have been built with continuous outputs of more than 10 watts at wavelengths of 10.6 microns, which is in the infrared region. Typically they have a life of 500 hours.

It will thus be seen that the benefits set forth above, among those made apparent from the preceding description are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the present invention, what is claimed as new and desired to secure by Letters Patent is:

1. An improved gas laser characterized as including an elongated sealed chamber, an at least partially reflective member at opposite ends of said chamber, an active gas within said chamber, a pair of electrodes, and an excitation means for causing said active gas to produce photons in response to an energy level transition wherein said improvement comprises each said electrodes is formed in the shape of a cylinder closed at one end disposed in a cylindrical recess in said chamber wall, and spaced therefrom a distance less than the mean free path of ions of said active gas at the operating temperature and pressure of said laser to thereby substantially preclude sputtering of material from the exterior surfaces of said electrode.

2. A laser as recited in claim 1 further including means for applying an axial magnetic field along each said recess to thereby direct any material sputtered from the interior of said electrodes back to the interior of said electrodes.

3. A laser as recited in claim 2 wherein said magnetic field producing means comprises a pair of annular permanent magnets disposed about the exterior walls of each said recess.

References Cited

UNITED STATES PATENTS 3,413,568  11/1968  Gordon et al. _____ 331—94.5
3,215,882  11/1965  Toomey _____ 313—109

OTHER REFERENCES

Means For Broadening the Area of Anode Bombardment in Beam-Focused Tubes; John T. Mark; RCA Technical Notes; December 1957.

High Power Laser Action in $CO_2$-He Mixtures; Moeller et al., Applied Physics Letters, vol. 7, No. 10, November 1965.

C. W. High Power $CO_2N_2$-He Laser; Applied Physics Letters; Patel et al., vol. 7, No. 11, December 1965.

RONALD L. WILBERT, Primary Examiner

CONRAD CLARK, Assistant Examiner